2,794,017

METHOD OF PROCESSING TALL OIL AND PRODUCTS PRODUCED THEREBY

Robert C. Palmer, Malcolm E. Hannah, Jr., and Alfred F. Wicke, Jr., Pensacola, Fla., assignors, by mesne assignments, to Heyden Newport Chemical Corporation, New York, N. Y., a corporation of Delaware No Drawing. Application May 14, 1953, Serial No. 355,182

15 Claims. (Cl. 260—97.6)

This invention relates to a method of processing tall oil, and more particularly to a method of obtaining from tall oil products useful in the preparation of esters for use in varnishes, enamels and the like.

As is well known, tall oil contains rosin and fatty acids. The latter are composed principally of oleic acid and linoleic acid in very approximately equal amounts, with a smaller proportion of a saturated fatty acid such as palmitic acid. In order to convert tall oil into a product having most desirable drying properties, we prefer to remove from the tall oil the relatively slow drying oleic acid and the non-drying palmitic acid. Such removal is not easy of accomplishment by distillation of tall oil itself, owing to the fact that the various saturated and unsaturated fatty acids present in tall oil have substantially similar vapor pressures.

We have now found, however, that by first treating the linoleic acid with a suitable catalyst so that the linoleic acid is made much more readily polymerizable and then polymerizing it, the separation of oleic acid and saturated fatty acids from the polymerized linoleic acid-rosin acids mixture can be easily effected by vacuum distillation. By varying the proportion of rosin in the starting material, we may vary the "oil length" of the polymerized linoleic acid-rosin acids mixture. "Oil length" is the ratio in a varnish base of the drying oil in gallons per 100 lbs. of resin. Thus, if we start with a tall oil fraction having a low rosin content, we get greater oil length, and vice versa. However, if the rosin in the starting fraction is reduced to practically zero, we have encountered difficulty in making the product into an ester of low acid value because it tends to gel too easily.

Any of the polymerized linoleic acid-rosin acids mixtures of our invention can be converted into esters by reaction with any of a wide number of poly-alcohols, such as glycerol, pentaerythritol, sorbitol, glycols, epichlorhydrin of bisphenol (so-called "Epon") and many others. A "penta" ester would be very much more rapid drying than a glycerol ester. "Penta" esters of fatty acids do not, of course, occur in nature. Mixed esters can also be made by selectively esterifying the fatty acids with one alcohol and the rosin acids with another. Thus, novel products can be produced.

It is therefore an important object of our invention to provide a method of processing tall oil to obtain products useful in the manufacture of esters for use in varnishes, enamels and the like.

It is a further important object of this invention to provide as novel products mixtures of polymerized linoleic acid and rosin acids, and esters produced therefrom.

It is a further important object of this invention to provide a method of processing tall oil to effect a separation therefrom of the relatively non-drying oils and to produce products from the remaining portion of the processed tall oil suitable for making into esters, varnishes, enamels or the like.

Other and further important objects of this invention will become apparent from the following description and appended claims.

The tall oil used as the starting material is preferably a refined tall oil fraction having a rosin acids content of between 5 and 75% by weight. An easily obtained refined tall oil fraction and one suitable for our starting material is a fraction containing approximately 30% rosin acid, 30% linoleic acid, 30% oleic acid, 5% palmitic acid, and 5% esters and unsaponifiables. The polymerized linoleic acid-rosin acids mixture obtained from such a starting material by our method, after being made into a glycerine ester, would be the equivalent of a 12½ gallon length ester gum—linseed oil varnish base. Where the starting material contains only 5% rosin acids, the corresponding oil length would be 90 gallons while if the starting material contains 75% rosin acids, the oil length would be 3⅓ gallons. These limits of between 5 and 75% by weight rosin acids are the practical limits of rosin acids content for our purposes when starting with a refined tall oil fraction.

In accordance with our invention the refined tall oil fraction used as starting material is first subjected to treatment with a catalyst capable of effecting the conversion of the linoleic acid present in the tall oil into a more readily polymerizable form. Apparently this pretreatment results in isomerization of the linoleic acid into a form having a substantially greater lability toward polymerization than possessed by the linoleic acid in the absence of this pretreatment.

STEP NO. 1

*Isomerization of linoleic acid*

The conversion is suitably effected by heating the tall oil fraction in the presence of an isomerization catalyst. Suitable isomerization catalysts include sulfur dioxide gas, sulfur and iodine. Sulfur dioxide, however, is the preferred catalyst. Using sulfur dioxide and temperatures of between 220 and 285° C. at atmospheric pressure, linoleic acid is readily converted into a more readily heat polymerizable form.

In the case of an isomerization step using sulfur dioxide, the proportion of sulfur dioxide required varies considerably but can be from 0.2 to 2.0% of sulfur dioxide by weight of the tall oil. Anything over about 2 weight percent of sulfur dioxide is probably unnecessary and wasted. About 1 weight percent of sulfur dioxide has been found to be optimum. The sulfur dioxide is suitably bubbled through the liquid mass of tall oil, either with or without agitation, or the full amount of sulfur dioxide and tall oil may be put into the reaction vessel at the start using super-atmospheric pressure, and the contents of the vessel vigorously agitated to effect extended contact between the sulfur dioxide and the tall oil.

The time of contact between the $SO_2$ and tall oil will depend upon the temperature employed. In general, from 5 to 6 hours at 220° C. is the equivalent of approximately one-half hour at 285° C., or 1 hour at 265° C. In any event, the times, temperatures and weight percentages of catalyst can be readily determined on a trial and error basis to achieve the optimum conditions for rendering the linoleic acid more susceptible to polymerization.

STEP NO. 2

*Steaming off of $SO_2$*

In the next step, the isomerization mass is steamed in order to remove any undissolved $SO_2$ and/or combined sulfur that is loosely bound and therefore capable of being decomposed and/or volatilized. During steaming, the mass is heated to a temperature of around 285° C., but preferably not over 300° C. Steaming is continued for a sufficient length of time to insure the removal of the SO₂ and other volatilizable sulfur compounds. The effectiveness of their removal is indicated by the absence of any SO₂ odor in the effluent vapors from the still. About 3 to 4% by weight of the charge in the still is removed by steam in this steaming operation. The composition of the distillate so removed is about 80% mixed fatty acids, mostly palmitic, together with neutral bodies and materials having a bad odor.

In the first step, with respect to the linoleic acid, substantially no polymerization takes place, but the lability of the linoleic acid toward polymerization is very substantially increased. The carrying out of step No. 2 largely eliminates the SO₂, which would, if left in the mass, be undesirable. Added advantages of the second step are the removal of odoriferous components, the improvement in color and the partial removal of the non-drying fatty acids. The linoleic acid is not steam distilled over to any appreciable extent in the steaming step.

STEP NO. 3

Polymerization of the linoleic acid

After the steaming step, the residual mass is heated at a temperature of around 265 to 300° C., preferably between 280 and 290° C. for a sufficient period of time to effect polymerization of the now readily polymerizable linoleic acid. The time will vary from about an hour to six hours, or even longer, depending upon the temperature employed, the higher the temperature the shorter the length of time required. Ordinarily the heating step will be carried out at atmospheric pressure and preferably in an inert atmosphere of nitrogen or carbon dioxide gas, but pressures both above or below atmospheric may be employed.

It will be noted that since no SO₂ is present in the residual mass during the polymerization step, polymerization is effected solely as the result of heat. On the other hand, heating to temperatures above 300° C. is to be avoided, since higher temperatures result in discoloration of the product. The fact that the linoleic acid can be completely polymerized by heat alone at temperatures no higher than 290° C. is due to the greater ease with which the treated linoleic acid polymerizes as compared with linoleic acid in its initial state in the tall oil fraction used as starting material.

The actual control of the polymerization step is accomplishesd by noting the viscosity of the mass undergoing treatment. When polymerization is complete, no further increase in viscosity occurs.

STEP NO. 4

Vacuum fractional distillation

After the completion of the polymerization of the linoleic acid, the mono-unsaturated and the saturated fatty acids can be readily separated from the polymerized linoleic acid-rosin acids mixture by vacuum fractional distilltaion. Where it is not essential to realize the best possible drying properties in the final esters made from our polymerized linoleic acid-rosin acids mixture, this step of vacuum fractional distillation may be omitted, since considerable improvement in drying properties is obtained even without such step. If the step is employed any conventional technique which will separate oleic acid from rosin acids can be used, since the polymerized linoleic acid is strictly non-volatile and is quite stable to heat. The rosin acids are also stable to heat due to the fact that they were largely disproportionated in the isomerization step, and disproportionated rosin acids do not decarboxylate readily with heat. The term "decarboxylate" means loss of the carboxylic acid radical, as by decomposition with attendant loss of CO₂, with resultant formation of hydrocarbons.

A convenient set of conditions for carrying out the vacuum fractional distillation is the use of from 1 to 10 mm., absolute Hg pressure, or even higher, in the presence of a small amount of steam to facilitate distillation. Using a fractionating column equivalent to five plates, about 95% of the rosin is kept in the still residue with a pot temperature of 280° C. at the end of the fractionating step.

STEP NO. 5

Reconversion of lactones into acids

We have found that as a result of the conditions of temperature and vacuum obtaining during heat treatment and distillation, a considerable formation of lactones often takes place. We find it desirable to break down these lactones into acids. This is suitably accomplished by steaming the polymerized lineloic acid-rosin acids mixture at from about 200 to 220° C., at atmospheric pressure and without removal of any appreciable amount of distillate. A weight of steam equal to about 3 to 4% of the polymerized linoleic acid-rosin acids is usually sufficient to reconvert the lactones present into free acids.

STEP NO. 6

Decolorization

This step is optional but in order to remove residual color bodies and also those formed in the process, the product resulting from step No. 4 is best subjected to a decolorization step. This can be accomplished by conventional contact methods or by percolation through decolorization media, such as decolorizing clays including fullers' earth.

It should be noted that our method up to this point deals with free acids and not with their glycerides, or other esters. We start with the free acids and effect isomerization of the linoleic acid so as to facilitate its polymerization and separation from the mono-unsaturated and saturated fatty acids. In a broader sense, therefore, our method is applicable to the separation of the relatively slow drying fatty acids having only a single ethylenic bond such as oleic acid, from relatively good drying acids having two or more ethylenic bonds, such as linoleic acid. As is well known, fatty acids do not "dry" as readily as fatty oils (glycerides) due to cross linking. However, fatty oils, such as soya bean, cotton seed or fish oils and linseed oil (containing the glycerides of oleic and linoleic acids) could not be successfully separated into the respective glycerides by our method of isomerization, polymerization and vacuum fractional distillation, since glycerides are not susceptible to fractionation by vacuum distillation under the conditions hereinabove described.

On the other hand, once the non-dry saturated and mono-unsaturated fatty acids have been separated from the linoleic acid following polymerization of the linoleic acid, the resulting polymerized linoleic acid can readily be esterified in the presence of more or less rosin acids with any of the poly-alcohols, including glycerol, and the esters so formed than used in making varnish bases. In fact, by the proper selection of the poly-alcohol, esters can be obtained that are much faster drying than any of the conventional glycerol esters.

It will be understood, then, that the polymerized linoleic acid-rosin acids mixture of our invention may be converted into a mixture of linoleic and rosin acid esters with any of the poly-alcohols, such as glycerol, pentaerythritol, sorbitol, the glycols, "Epon" and others. Alternatively, the linoleic acid can be esterified with one poly-alcohol, and the rosin with another poly-alcohol.

The following examples will serve to give preferred embodiments of our invention.

*Example I.—Using SO₂ as the isomerization catalyst*

The starting material for this example was a refined tall oil fraction having an acid value of 187.0 and the following approximate analysis:

| | Percent by wt. |
|---|---|
| Rosin acids | 28.5 |
| Fatty acids | 67.5 |
| Oleic acid | 30 |
| Linoleic acid | 30 |
| Palmitic | 7.5 |
| Esters and unsaponifiables | 4.0 |

In the isomerization step, the foregoing refined tall oil fraction was heated to 265° C. and $SO_2$ bubbled through the mass without mechanical agitation for one hour at the rate of 1% $SO_2$ by weight of the mass. When isomerization was complete, the cloud point was 13° C., the viscosity was G-H (Gardner-Holt) and the index of refraction at 20° C. was 1.4893.

In the next step, which is the steaming step, the temperature of the mass was raised to 285–290° C. and steam was blown through the mass as the temperature rose. Steaming was continued for 15–20 minutes, with the removal of an oil distillate equivalent to about 3% by volume of the mass.

The steam required a maximum of 50 ml. of water per 100 ml. of oil distillate. The steam heads had a strong odor of $SO_2$.

After the steaming step, the residual mass was subjected to heat treatment to effect polymerization with the temperature held between 285–290° C. for 4 hours. At the end of that period the refractive index at 20° C. was 1.4912, the viscosity was about 0.

Following the heat treatment, the resulting mass was subjected to distillation through a column of four to five plates to separate the volatile mono-unsaturated and saturated fatty acids from the polymerized linoleic acid-rosin acids mixture. The analysis of the product resulting from this distillation was as follows:

| | Percent by wt. |
|---|---|
| Distillates: | |
| Heads | 5–10 |
| Saturated fatty acid cut | 10–15 |
| Mono-unsaturated fatty acid | 30–35 |
| Residue: | |
| Polymerized linoleic-rosin acids | 50–55 |

The distillation was carried out at a vacuum of around 5 mm. Hg pressure with a still temperature at the end of about 280° C. At the end of the distillation, the polymerized linoleic acid-rosin acids which are now substantially free from monomeric fatty acids, were steamed at 200–220° C. for 15–20 minutes at atmospheric pressure, using a volume of steam equal to 3–4% of the polymerized linoleic acid-rosin acids mixture, but no distillate was removed. This final steaming step was for the purpose of decomposing any lactones formed during the vacuum fractional distillation.

The polymerized linoleic acid-rosin acids mixture was then recovered from the still pot and found to have the following analysis:

| | |
|---|---|
| Rosin acids percent by wt | 43.7 |
| Polymerized linoleic acid do | 42.2 |
| Esters and unsaponifiables do | 14.1 |
| Acid value | 165.0 |

This composition when esterified is equivalent to a 12 gallon oil length vehicle.

The polymerized linoleic acid-rosin acids mixture so obtained was subjected to a decolorization step. For this purpose, the mixture was dissolved in a low boiling naphtha solution to about 60% solids content and subjected to treatment with a contact earth, such as an earth known as Neutral I or Super Filtrol. The earth should be dry in order to decolorize most effectively. The decolorization step was carried out at between 35–60° C., stirring well for about 30 minutes and then filtering. The filtrate was then evaporated to recover the decolorized polymerized linoleic acid-rosin acids mixture.

In place of sulfur dioxide as the catalyst in the isomerization step either sulfur or iodine may be used, but this necessitates some changes in the process. The conditions using sulfur and iodine, respectively, will be briefly described.

*Example II.—Using sulfur as the isomerization catalyst*

A charge of a refined tall oil fraction similar to that used in Example I was heated to 140° C. and about 1% of sulfur in powered form was added, based upon the weight of the tall oil fraction. The temperature of the mass was then raised to between 287–290° C. and kept within that range for 5 hours. The mass was then steamed for 15 minutes to remove easily volatilized fractions. The resulting mass that was recovered from the still pot had the following analysis and constants:

| | | |
|---|---|---|
| Rosin acids | percent by wt | 25.4 |
| Fatty acids | do | 64.2 |
| Esters and unsaponifiables | do | 10.4 |
| Acid value | | 174.9 |
| Viscosity | | M |

The recovered mass was next distilled through an eight plate column at a vacuum of 3 mm. Hg. The distillation was stopped when a temperature of 286° C. was reached. The residue was then steamed for 15 minutes between 200–210° C. to decompose any lactones present into the corresponding acids. The residue remaining in the still had the following analysis:

| | | |
|---|---|---|
| Rosin acids | percent by wt | 41.0 |
| Polymerized linoleic acid | do | 40.7 |
| Esters and unsaponifiables | do | 18.3 |
| Acid value | | 157.0 |

*Example III.—Using iodine as the isomerization catalyst*

In this example 0.1% of iodine by weight of the refined tall oil fraction was employed. The tall oil fraction had substantially the same analysis as in Examples I and II. The tall oil fraction was first heated to 160° C. and the iodine then added. Next, the temperature was raised to 180° C. and held there for 1 hour and the mass then steamed to remove any decomposition compounds or iodine, itself. The temperature was thereafter raised to between 287–292° C. and held for 4 hours within this range. The resulting mass had the following analysis and constants:

| | | |
|---|---|---|
| Rosin acids | percent by wt | 21.2 |
| Fatty acids | do | 59.0 |
| Ester and unsaponifiables | do | 18.8 |
| Acid value | | 157.1 |
| Viscosity | | J |
| Cloud point | ° C | 10 |
| $RI_D^{20}$ ° C | | 1.4931 |

The mass having the above analysis was then distilled through an eight plate column at 8 mm. Hg. The distillation was continued until the still temperature reached 300° C., at which point the distillation was stopped. The residue had the following analysis:

| | | |
|---|---|---|
| Rosin acids | percent by wt | 39.4 |
| Polymerized linoleic acid | do | 38.2 |
| Esters and unsaponifiables | do | 22.4 |
| Acid value | | 149.9 |

The oil length for this product was 12.5 gallons.

*Example IV.—Production of linoleic acid-rosin-acids mixture without separation of mono-unsaturated and saturated fatty acids*

As previously indicated herein, where the fastest drying characteristics are not required in the varnish bases made from our linoleic acid-rosin acids mixture, we can obtain products having less rapid drying properties but still improved drying properties as compared with those of the tall oil fractions in which the isomerization and polymerization of the linoleic acid have not been carried out. The following example will give a modification of our process in which the step of separating the mono-unsaturated and saturated fatty acids is omitted.

The refined tall oil fraction used as starting material in this example had the following analysis and acid value:

| | |
|---|---|
| Rosin acids_____percent by wt__ | 60.00 |
| Fatty acids_____do____ | 36.0 |
| Esters and unsaponifiables_____do____ | 4.0 |
| Acid value_____ | 182 |

1200 grams of the foregoing tall oil fraction were charged into a flask provided with a gas inlet and outlet and with a mechanical stirrer. The charge was then heated to 260° C. and sulfur dioxide passed through the charge, with stirring, for 1 hour at the rate of 1% by weight of SO₂ per hour based on the weight of the tall oil fraction. The mass was then steamed with the heat off for 35 minutes to remove volatile sulfur compounds and the flask swept with an inert gas. Thereafter 3% by weight of maleic anhydride was added, with stirring, and the temperature held at 200° C. for 1 hour.

At the completion of the steaming operation, the mass may be subjected to heat treatment to effect polymerization of the linoleic acid the same as in step No. 3 described hereinabove, and also the same as in the corresponding step in Example I, before reacting the mass with maleic anhydride. The amount of maleic anhydride added may vary between 0.5 and 5.0% by weight, or the percentage may be even higher depending upon the isodiene number of the mass. In place of the maleic anhydride fumaric acid may be used in similar proportions and with similar results.

The purpose of the maleic anhydride, or fumaric acid, is to react with the dienophilic materials present.

Esters may then be prepared from the treated product just described as follows:

600 grams of the foregoing material, having an acid value of 192, were charged into a 1000 ml. flask equipped with a water trap, reflux condenser and a drop funnel. The batch was heated to 250° C. and 82.1 grams of pentaerythritol (representing a 2% excess over theoretical) slurried with 150 grams mineral spirits, were added over a period of 75 minutes. During the addition, the temperature was allowed to rise to 270° C. Mineral spirits and the water of esterification were drawn off through the water trap so that the batch stayed at 270–275° C. under constant reflux. The batch was held at 270–275° C. under reflux for about 12 hours until the acid number of the solids portion was under 10. Mineral spirits were then added to reduce the solids to 70% by weight. The viscosity for varying solids content is indicated in the following table:

| | |
|---|---|
| At 70% viscosity_____ | U |
| At 65% viscosity_____ | J |
| At 60% viscosity_____ | D–E |
| At 55% viscosity_____ | B |

Driers were added as naphthenates to the 55% solids content solution to give 0.5% lead and 0.1% cobalt metal based upon the oil content. The material was found to dry tack-free in 4½ hours.

Further improvement in the products produced by the method of Example IV can be realized by removing the unsaturated fatty acid content at any stage prior to esterification.

*Example V.—Separation of the di-unsaturated fatty acids from other fatty acids, with no rosin acids present*

(1) This example will serve to illustrate the modification of our method in which the principles of our invention are applied to the separation of a di-unsaturated fatty acid from a mixture of mono-unsaturated and saturated fatty acids, in the absence of rosin acids.

The starting material had the following analysis and constants:

| | |
|---|---|
| Palmitic acid_____percent__ | 17.7 |
| Stearic acid_____do____ | 7.6 |
| Oleic acid_____do____ | 18.6 |
| Linoleic acid_____do____ | 48.0 |
| Linolenic acid_____do____ | 5.6 |
| Acid value_____ | 200.1 |
| Fatty acids_____ | 99.8 |
| Viscosity_____ | A–1 |
| $RI_D^{20°}$ C. _____ | 1.4663 |

This starting material was soya bean fatty acids. 1326 grams of the starting material were heated to 265° C. and 1% of SO₂ was passed through the mass in a period of 1 hour. The temperature was then raised from 265 to 285° C. and steam passed through until 34 grams of oil had been removed. The temperature was held at between 287–292° C. for 4 hours. At the end of that period, the refractive index at 20° C. was 1.4724 and the viscosity was E.

The mass was then vacuum fractionally distilled in an eight plate column maintained at 7 mm. Hg pressure. The distillation was stopped when the still temperature reached 295° C. At this point, 55.2% of the mass had been distilled over and a residue of 493 grams, or 37.2%, remained. After steaming the residue for 15 minutes at 200–220° C., it had an acid value of 171.2, and a viscosity of Z1.

(2) This part of Example V was similar to part (1) except that double distilled cotton seed acids were used as starting material, having the following analysis:

| | |
|---|---|
| Palmitic acid_____percent__ | 26.7 |
| Oleic acid_____do____ | 32.2 |
| Linoleic acid_____do____ | 39.5 |
| Acid value_____ | 204.0 |

A charge of 1329 grams of this starting material was heated to 265° C. and 1% by weight of SO₂ passed through it over a period of 1 hour. The charge was then steamed to remove 57 grams of oil, after which it was heated for 4 hours at 288–292° C. The charge was then distilled through an eight plate column at 5 mm. Hg pressure until the still temperature was 300° C. The distillate so obtained amounted to 875 grams, or 66.0% by weight of the mass undergoing distillation. The residue after being steamed for 15 minutes at 200–220° C., without recovery of any distillate, amounted to 346 grams, or 26.1% by weight. This residue had an acid value of 153.0, and a viscosity of Z—Z1.

In both parts (1) and (2) of this Example V the residues obtained were substantially free from monomeric acids as evidenced by the final still temperatures of 295° C. and 300° C., respectively.

*Example VI.—Preparation of pentaerythritol ester of the polymerized linoleic acid-rosin acids mixture*

In this example, a polymerized linoleic acid-rosin acids mixture having the following analysis and acid value was used as the starting material:

| | |
|---|---|
| Rosin acids_____percent by weight__ | 41.0 |
| Polymerized linoleic_____do____ | 46.4 |
| Esters and unsaponifiables_____do____ | 12.6 |
| Acid value_____ | 168.4 |

Four hundred parts by weight of this analysis starting material were heated to 200° C., and 44.4 parts by weight of pentaerythritol were added, with stirring, over a period of 1¼ hours. The amount of pentaerythritol was equivalent to 11% by weight of the starting material and was 2% in excess of the theoretical amount required to completely esterify the starting material. As soon as all the pentaerythritol was in, the temperature was raised to 290° C. and samples were taken at intervals, with the following results:

At end of:
- 1 hour _____ 32.4 acid value.
- 2 hours_____ 22.5 acid value.
- 3 hours_____ 18.0 acid value.
- 4 hours_____ 15.9 acid value.
- 5 hours_____ 14.6 acid value (stopped).

The resulting ester, or mixture of esters, was steamed slowly from 260° C. to 230° C. to remove any unreacted pentaerythritol, and then cut back to 70% solids with mineral spirits.

The viscosities of solutions of various solids contents were as follows:

- 70% solids_____ Z4
- 60% _____ X–Y
- 50% _____ P
- 45% _____ H–I
- 40% _____ D–E The ester solution of 40% solids content in mineral spirits, with a drier equivalent to 0.5% lead and 0.10% cobalt, as metals based on the oil content and added as naphthenates, was tested for drying and found to dry tack-free in 7 hours.

*Example VII.—Preparation of mixed pentaerythritol-glycerol esters of the polymerized linoleic acid-rosin acids mixture*

In this example, the starting material was a polymerized linoleic acid-rosin acids mixture having the following analysis:

- Rosin acids_____percent by weight__ 43.4
- Polymerized linoleic_____do____ 40.7
- Esters and unsaponifiables_____do____ 15.6
- Acid value_____ 161.0

Six hundred and fifty parts by weight of this analysis starting material were heated to 260° C. and 60.3 parts by weight of pentaerythritol were added over a period of 45 minutes. The temperature was raised to 270° C. The amount of pentaerythritol was enough to esterify the acid mixture to a 20 acid value. Samples were taken at intervals to check the rate of esterification. In 8½ hours the acid value had dropped to 25.0. At this point, the temperature had fallen to 250° C. 9.1 parts by weight of glycerol were dropped into the esterification reaction mass over a period of 30 minutes. The acid values were again checked at hourly intervals and at the end of 6 hours from the time of adding the glycerol, the acid value was 9.9. The mass was cooled back to 200° C. and mineral spirits added to give a 70% solids content.

The viscosities of solutions of various solids content were as follows:

- 70% solids_____ U
- 65% solids_____ M–N
- 60% solids_____ H
- 55% solids_____ D–E The ester, or mixed esters, was tested at 55% solids content in mineral spirits with a drier equivalent to 0.5% lead and 0.10% cobalt metal based upon the oil content and added as naphthenates and found to dry tack-free in 5 hours.

We claim as our invention:

1. In the method of producing a rapid drying composition from a tall oil containing rosin acids and linoleic acid in its non-conjugated form, the steps of heating the tall oil in the presence of an isomerization catalyst selected from the group consisting of sulfur, sulfur dioxide, and iodine to convert the linoleic acid into a more readily polymerizable form, steaming the resulting mass to remove objectionable material derived from the catalyst, heating the then resulting mass to polymerize the polymerizable linoleic acid and fractionally distilling to recover a relatively non-volatile linoleic acid-rosin acids mixture.

2. In the method of producing a rapid drying composition from a tall oil fraction containing between 5% and 75% rosin acids by weight, and, in addition, linoleic acid and oleic acid, the steps of heating the tall oil in the presence of an isomerization catalyst selected from the group consisting of sulfur, sulfur dioxide and iodine to convert linoleic acid present into a more readily polymerizable form, steaming the resulting mass to remove objectionable material derived from the catalyst, heating the then resulting mass to polymerize the polymerizable linoleic acid and vacuum fractionally distilling to recover a relatively non-volatile polymerized linoleic acid-rosin acids mixture.

3. In the method of producing a rapid drying composition from tall oil, the steps of heating the tall oil in the presence of sulfur dioxide to convert linoleic acid present into a more readily polymerizable form, steaming the resulting mass to remove sulfur dioxide residues and steam distillables, heating the then resulting mass to polymerize the polymerizable linoleic acid and vacuum fractionally distilling to separate mono-unsaturated and saturated fatty acids and recover a relatively non-volatile linoleic acid-rosin acids mixture.

4. In a method of processing a tall oil fraction containing rosin, linoleic and oleic acids, the steps of heating a mass of the tall oil fraction to a temperature of about 220 to 285° C. while bubbling sulfur dioxide gas through said mass, continuing contact between said mass and sulfur dioxide gas for a sufficient period of time to effect isomerization of the linoleic acid present to a more readily polymerizable form, steaming the mass to remove steam volatilizable sulfur-containing compounds, heating the then remaining mass to effect polymerization of the polymerizable linoleic acid present, vacuum distilling the then remaining mass to distill off mono-unsaturated and saturated fatty acids and recovering the resulting linoleic acid-rosin acids mixture substantially free of mono-unsaturated and saturated fatty acids.

5. In a method of processing a tall oil fraction containing rosin, linoleic and oleic acids, the steps of heating a mass of the tall oil fraction to a temperature of about 220 to 285° C. while contacting said mass with sulfur dioxide gas, continuing contact between said mass and sulfur dioxide gas for a sufficient period of time to effect isomerization of the linoleic acid present to a more readily polymerizable form, steaming the mass to remove steam volatilizable sulfur-containing compounds and heating the then remaining mass to effect polymerization of the polymerizable linoleic acid present, vacuum fractionally distilling the then remaining mass to distill off volatile fatty acids and recovering the resulting polymerized linoleic acid-rosin acids mixture substantially free of volatile fatty acids.

6. In a method of processing a tall oil fraction containing from 5 to 75% of rosin acids by weight and the balance largely linoleic and oleic acids, the steps of heating a mass of the tall oil fraction to a temperature of about 220 to 285° C. while bubbling sulfur dioxide gas through said mass, continuing contact between said mass and sulfur dioxide gas for a sufficient period of time to effect isomerization of the linoleic acid present to a more readily polymerizable form, steaming the mass to remove steam volatilizable sulfur-containing compounds, heating the then remaining mass in the absence of sulfur-containing compounds to effect polymerization of the polymerizable linoleic acid present, vacuum fractionally distilling the then remaining mass to distill off mono-unsaturated and saturated fatty acids without distillation of the polymerized linoleic acid and rosin acids and recovering the resulting polymerized linoleic acid-rosin acids mixture.

7. In a method of processing a refined tall oil fraction containing rosin, oleic and linoleic acids, the steps of heating a mass of said tall oil fraction to a temperature of 220 to 285° C., contacting said heated mass with about 1% by weight of sulfur dioxide for a sufficient length of time to effect isomerization of the linoleic acid to a more readily polymerizable form, steaming said mass to eliminate sulfur dioxide remaining therein, heating the then remaining mass to a temperature of about 280 to 290° C. to effect polymerization of said polymerizable linoleic acid, vacuum fractionally distilling the then remaining mass to remove mono-unsaturated and saturated fatty acids therefrom and recovering a polymerized linoleic acid-rosin acids mixture.

8. The method of treating a mixture of rosin, saturated, mono-unsaturated and di-unsaturated fatty acids, which comprises subjecting said mixture to the action of an isomerization catalyst selected from the group consisting of sulfur, sulfur dioxide, and iodine at an elevated temperature for a sufficient time to effect isomerization of the di-unsaturated fatty acid to a more readily polymerizable form, largely eliminating any catalyst remaining in said mixture, heating said mixture to effect polymerization of said polymerizable di-unsaturated fatty acid, subjecting the resulting reaction mixture to vacuum fractional distillation to distill off saturated and mono-unsaturated fatty acids and recovering as still residue a mixture of rosin and polymerized di-unsaturated fatty acids.

9. The method of processing a mixture of saturated, mono-unsaturated and di-unsaturated fatty acids, which comprises subjecting said mixture to the action of an isomerization catalyst selected from the group consisting of sulfur dioxide, sulfur and iodine at an elevated temperature for a sufficient time to effect isomerization of the di-unsaturated fatty acid to a more readily polymerizable form, steaming said mixture to remove easily volatilized fractions, heating said mixture to effect polymerization of said polymerizable di-unsaturated fatty acid, subjecting the resulting reaction mixture to vacuum fractional distillation to distill off saturated and mono-unsaturated fatty acids and recovering non-volatile polymerized di-unsaturated fatty acids substantially free of said saturated and mono-unsaturated fatty acids.

10. In a method of processing a refined tall oil fraction containing oleic, linoleic and palmitic acids and from 5 to 75% by weight of rosin acids, the steps of heating a mass of said tall oil fraction to a temperature of 220 to 285° C., contacting said heated mass with about 1% by weight of sulfur dioxide for a sufficient length of time to effect isomerization of the linoleic acid to a more readily polymerizable form, steaming said mass to remove the sulfur dioxide remaining therein, heating the remaining sulfur dioxide-free mass to a temperature of about 280 to 290° C. to effect polymerization of said polymerizable linoleic acid, and recovering from said mass said polymerized linoleic acid in admixture with rosin acids within limits equivalent to an oil length between 3⅓ and 90 gallons.

11. As a new composition of matter, an oleoresin varnish base comprising a mixture of esters of a polymerized linoleic acid-rosin acids mixture produced by the method of claim 2.

12. As a new composition of matter, an oleoresin varnish base comprising polyhydric alcohol esters of a polymerized linoleic acid-rosin acids mixture produced by the method of claim 2.

13. Pentaerythritol esters of a polymerized linoleic acid-rosin acids mixture produced by the method of claim 2.

14. Mixed pentaerythritol and glycerol esters of a linoleic acid-rosin acids mixture produced by the method of claim 2.

15. A polymerized linoleic acid-rosin acids mixture produced by the method of claim 2 and having an equivalent oil length of between 3⅓ and 90 gallons.

References Cited in the file of this patent

UNITED STATES PATENTS

| Number | Name | Date |
|---|---|---|
| 2,311,386 | Hasselstrom | Feb. 16, 1943 |
| 2,346,409 | Anderson | Apr. 11, 1944 |
| 2,365,300 | Segessemann | Dec. 19, 1944 |
| 2,371,230 | Dressler et al. | Mar. 13, 1945 |
| 2,385,912 | Davis et al. | Oct. 2, 1945 |
| 2,495,305 | Wyler | Jan. 24, 1950 |
| 2,503,268 | Hasselstrom | Apr. 11, 1950 |
| 2,565,484 | Dunlop et al. | Aug. 28, 1951 |
| 2,572,035 | Jordan et al. | Oct. 23, 1951 |
| 2,585,222 | Bruins et al. | Feb. 12, 1952 |
| 2,617,791 | Snelling | Nov. 11, 1952 |
| 2,617,792 | Floyd | Nov. 11, 1952 |

OTHER REFERENCES

Paper Trade Journal, vol. 123, #22 (Nov. 28, 1946), pp. 35–40, 260–97.5.

Paint Oil and Chem. Reviews, Nov. 11, 1948, pp. 42–46, 260–97.5.